(12) United States Patent
Hilberer et al.

(10) Patent No.: US 8,053,480 B2
(45) Date of Patent: Nov. 8, 2011

(54) PROCESS FOR MAKING AND USING FOAM CONTROL COMPOSITIONS

(75) Inventors: Alain Hilberer, Recquignies (FR); Emilie Navet, Villers-la-ville (BE); Laurent Vermeire, Le Roeulx (BE)

(73) Assignee: Dow Corning Corporation, Midland, MI (US)

( * ) Notice: Subject to any disclaimer, the term of this patent is extended or adjusted under 35 U.S.C. 154(b) by 49 days.

(21) Appl. No.: 12/302,507

(22) PCT Filed: May 17, 2007

(86) PCT No.: PCT/EP2007/054799
§ 371 (c)(1),
(2), (4) Date: Jul. 30, 2009

(87) PCT Pub. No.: WO2007/137948
PCT Pub. Date: Dec. 6, 2007

(65) Prior Publication Data
US 2009/0306282 A1    Dec. 10, 2009

(30) Foreign Application Priority Data

May 31, 2006 (GB) .................................. 0610622.3

(51) Int. Cl.
*B01D 19/04* (2006.01)

(52) U.S. Cl. ........ 516/123; 516/116; 516/117; 525/477; 525/478; 524/492; 524/588; 528/31; 528/32; 528/502 F

(58) Field of Classification Search .......... None
See application file for complete search history.

(56) References Cited

U.S. PATENT DOCUMENTS

| | | |
|---|---|---|
| 2,823,218 A | 2/1958 | Speier et al. |
| 3,419,359 A | 12/1968 | Anderson et al. |
| 3,419,593 A | 12/1968 | Willing |
| 3,445,420 A | 5/1969 | Kookootsedes et al. |
| 3,697,473 A | 10/1972 | Polmanteer et al. |
| 3,814,731 A | 6/1974 | Nitzsche et al. |
| 3,890,359 A | 6/1975 | Chandra |
| 4,123,604 A | 10/1978 | Sandford, Jr. |
| 4,477,626 A | 10/1984 | Suzuki |
| 4,741,861 A | 5/1988 | Okada et al. |
| 5,227,081 A * | 7/1993 | Sawa et al. ............... 508/126 |
| 6,129,978 A * | 10/2000 | Caldwell ..................... 428/213 |
| 6,165,968 A | 12/2000 | Lenoble |
| 6,365,670 B1 * | 4/2002 | Fry ................................ 524/862 |
| 6,656,975 B1 | 12/2003 | Christiano et al. |
| 7,105,581 B2 | 9/2006 | Burger et al. |
| 7,708,476 B2 * | 5/2010 | Liu ................................. 385/98 |
| 2007/0230131 A1 * | 10/2007 | Bunyan et al. ................ 361/704 |

FOREIGN PATENT DOCUMENTS

| | | |
|---|---|---|
| EP | 0047630 A1 | 3/1982 |
| EP | 0217501 A2 | 4/1987 |
| EP | 0270273 A2 | 6/1988 |
| EP | 0434060 A2 | 6/1991 |
| EP | 0499364 A1 | 8/1992 |
| EP | 0254499 B1 | 9/1993 |
| EP | 0636684 A2 | 2/1995 |
| EP | 0516109 B1 | 5/1995 |
| EP | 0716870 A1 | 6/1996 |
| EP | 1424117 A2 | 6/2004 |
| GB | 1296308 | 11/1972 |
| GB | 2257709 A | 1/1993 |

OTHER PUBLICATIONS

Abstract for JP 2006-169343 A (Jun. 2006).*
Machine-generated translation for JP 2006-169343 A (Jun. 2006).*
English language abstract for EP0716870 extracted from espacenet. com database, dated Apr. 27, 2009.
English language abstract for EP1424117 extracted from espacenet. com database, dated Apr. 28, 2009.
PCT International Search Report for PCT/EP2007/054799 dated Aug. 7, 2007, 4 pages.

* cited by examiner

Primary Examiner — Marc Zimmer
(74) Attorney, Agent, or Firm — Howard & Howard Attorneys PLLC

(57) ABSTRACT

A process for making a foam control composition comprising a cross-linked polyorganosiloxane in which is dispersed a filler, with hydrophobic surface, comprising step (A) mixing (i) a finely divided filler, (ii) a polyorganosiloxane having on at least two reactive substituents, for example on average two reactive substituents, and (iii) a polyorganosiloxane having at least three reactive substituents, capable of addition reaction via hydrosilylation; (B) hydrosilylation reaction of components (ii) and (iii) until the mixture at least partially gels, followed by applying shearing forces to this at least partially gelled mixture. Optionally step (A) comprises a diluent or solvent and after step (B) an emulsification step is carried out to make the foam control composition into an O/W emulsion. Also a process for controlling foam in an aqueous environment by using a foam control composition according to the invention, selected from inks, coatings, paints, detergents, black liquor of from those encountered during pulp and paper manufacture, waste water treatment, textile dyeing processes or the scrubbing of natural gas.

23 Claims, No Drawings

PROCESS FOR MAKING AND USING FOAM CONTROL COMPOSITIONS

RELATED APPLICATIONS

This application claims priority to and all the advantages of International Patent Application No. PCT/EP2007/054799, filed on May 17, 2007, which claims priority to Great Britain Patent Application No. GB0610622.3, filed on May 31, 2006.

The present invention relates to a process for making foam control compositions, especially compositions which are of use in aqueous media, such as the paper making and pulping process, textile dyeing process, inks, coatings, paints, detergents, waste water treatment, the scrubbing of natural gas and metal working process. In particular the invention relates to a process of making foam control compositions which comprise silicone materials, in particular branched or cross-linked silicone materials. The invention also relates to the foam control compositions thus made and to the different systems and processes, such as inks, coatings, paints, detergents, black liquor, and pulp and paper manufacture, waste water treatment, textile dyeing processes, metal working process and the scrubbing of natural gas, using such foam control compositions.

Foam control compositions for pulping processes have been known and used for some time and have been described in a number of publications. A very important type of such pulping foam control compositions are based on silicone materials. For example GB1296308, published in 1972, describes antifoam compositions for aqueous systems which comprise a water insoluble organic liquid, e.g., mineral oil, a siloxane polymer, a filler and an ingredient which makes the filler compatible with the siloxane polymer. The compositions are claimed to be useful in the pulp and paper industry. In U.S. Pat. No. 6,656,975 silicone compositions are described which comprise a continuous phase of a polar organic liquid having dispersed in it particles of a silicone antifoam material encapsulated within an organic encapsulating material of certain characteristics. The silicone antifoam is indicated as comprising a polyorganosiloxane fluid and a hydrophobic filler, where the polyorganosiloxane fluid is a linear, branched, or cross-linked polydiorganosiloxane having a silanol level of 0.01-0.05 wt. %. The silicone composition is used for controlling foam in an aqueous medium, e.g. in the pulp and paper industry. Silicone-based foam control agents are known, and those using branched polyorganosiloxanes fluids have been described as being particularly useful for detergent compositions. For example EP 0434060 describes a silicone antifoaming agent composition, comprising a polydiorganosiloxane, silica and 1 to 200 parts by weight per 100 parts by weight of the polydiorganosiloxane and silica combined, of a cross-linked organopolysiloxane polymer exhibiting fluidity. In GB 2257709, there is described A method for preparing a silicone foam control agent which comprises the steps of forming a mixture of a vinyl end-blocked polydiorganosiloxane, a volatile, low viscosity organohydrogensiloxane, having at least 3 silicon-bonded hydrogen atoms and a solvent; reacting said mixture in the presence of a noble metal catalyst to make a branched organopolysiloxane, and adding to the mixture a finely divided particulate material, having a surface rendered hydrophobic by contact with a treating agent.

Thus silicone-based or silicone comprising foam control compositions can be prepared by mixing at least 2 liquid materials which then undergo a chemical reaction in liquid phase, which is for example a condensation or an addition type reaction, such as hydrosilylation (also called hydrosilation) or silanol-silyl reaction. A particular material, e.g. filler is often added, which may be done before or after the reaction. For example, in EP 0217501 there is described a foam control composition comprising (A) a liquid siloxane component and (B) a finely divided filler having its surface rendered hydrophobic, characterised in that the liquid siloxane component (A) has a viscosity at 25° C. of at least $7 \times 10^{-3}$ m$^2$/s and is obtained by mixing (1) 100 parts by weight of a polydiorganosiloxane having triorganosiloxy end groups; (2) from 10 to 125 parts by weight of a polydiorganosiloxane having at least one terminal silanol group and at least 40 Si atoms, and (3) from 0.5 to 10 parts by weight of an organopolysiloxane resin comprising $R''_3SiO_{1/2}$ units and $SiO_2$ units in a ratio of from 0.5:1 to 1.2:1 and in which R" denotes a monovalent hydrocarbon group containing from 1 to 6 carbon atoms, said resin having on average at least one silicon-bonded hydroxyl group per molecule and thereafter heating the mixture.

EP 0 270 273 describes reacting a mixture of components including a polyorganosiloxane fluid with at least one hydroxyl and/or hydrocarbonoxy group, a resinous siloxane or a silicone resin-producing silicon compound, a finely divided filler material and a catalyst to promote the reaction of the components. EP0047630 A describes a composite antifoaming agent formed by mixing and reacting an organopolysiloxane oil and/or a hydrocarbon oil; an organohydrogenpolysiloxane; a finely divided silica; and optionally a catalyst for the reaction of silicon-bonded hydrogen atoms with silicon-bonded hydroxyl radicals. EP 0 254 499 B describes a silicone defoamer composition obtained from different polyorganosiloxane components which are first mixed and reacted with heating. A filler is added before or after the condensation reaction. U.S. Pat. No. 4,741,861 describes a silicone-based antifoam composition comprising 3 kinds of diorganopolysiloxanes including one terminated at both molecular chain ends with a vinyl diorganosilyl group and one terminated at both at both molecular chain ends with a diorganosilyl group having a silicon-bonded hydrogen atom, a finely divided silica powder an a platinum compound as catalyst. The increase in molecular weight of the diorganopolysiloxane, which is chosen with relatively low viscosity and may be emulsified in an aqueous medium, is suggested to take place after emulsification by the addition reaction. EP 0 516 109 B1 describes silicone defoamer compositions prepared by heating a mixture of components which include a trimethylsiloxy-terminated dimethylpolysiloxane, a vinyldimethylsiloxy-terminated dimethylpolysiloxane, a dimethylsiloxane-methylhydrogensiloxane copolymer, a trimethylsiloxysilicate, microparticulate silica, and platinum catalyst.

There is constantly a need to provide further improved foam control agents for aqueous media, such as the paper making and pulp industry, textile dyeing applications and metal working applications, but in particular for the pulping process, such as the Kraft® pulping process. A preferred process for making suitable foam control compositions comprising a branched or cross-linked polyorganosiloxane material in which is dispersed a finely divided filler, whose surface is hydrophobic, comprises the steps of a) mixing (i) a finely divided filler, (ii) a polyorganosiloxane having on average at least two reactive substituents, capable of addition reaction with component (iii) via hydrosilylation and (iii) a polyorganosiloxane having at least three reactive substituents, capable of addition reaction with component (ii) via hydrosilylation;

b) followed by causing hydrosilylation reaction of components (ii) and (iii) in the presence of a transition metal catalyst.

It has now surprisingly been found that if the process for making a foam control agent which comprises a branched, a lightly, a partially or a fully cross-linked silicone, preferably polyorganosiloxane, includes both adding a finely divided filler prior to the formation of the branched or cross-linked polyorganosiloxane and forming an at least partially gelled structure or mixture of the branched or cross-linked polyorganosiloxane to which shear forces are applied, improved foam control compositions can be obtained.

Accordingly, in one of its aspects, the present invention provides a process for making a foam control composition comprising a branched or cross-linked polyorganosiloxane material in which is dispersed a finely divided filler, whose surface is hydrophobic, which comprises the steps of A) mixing prior to step (B) (i) a finely divided filler, (ii) a polyorganosiloxane having at least two reactive substituents, preferably on average two reactive substituents, capable of addition reaction with component (iii) via hydrosilylation and (iii) a polyorganosiloxane having at least three reactive substituents, capable of addition reaction with component (ii) via hydrosilylation;

B) followed by causing hydrosilylation reaction of components (ii) and (iii) in the presence of a transition metal catalyst wherein the hydrosilylation reaction is conducted until the reaction mixture gels at least partially, and shearing forces are applied to this at least partially gelled mixture.

The finely divided filler (i) to be used in step (A) of the process of the invention is a finely divided particulate material. It may be any of the known inorganic fillers suitable for formulating foam control compositions. Such fillers are described in many patent applications and are commercially available. They include fumed $TiO_2$, $Al2O3$, aluminosilicates, zinc oxide, magnesium oxide, salts of aliphatic carboxylic acids, polyethylene wax, reaction products of isocyanates with certain materials, e.g. cyclohexylamine, alkyl amides, e.g. ethylene or methylene bis stearamide and $SiO_2$ with a surface area as measured by BET measurement of at least 50 $m^2/g$. Preferred fillers are silica fillers which can be made according to any of the standard manufacturing techniques for example thermal decomposition of a silicon halide, a decomposition and precipitation of a metal salt of silicic acid, e.g. sodium silicate and a gel formation method. It is preferred that silica used in a process according to this invention is a precipitated silica or a gel formation silica, most preferably precipitated silica. The average particle size of these fillers may range from 0.1 to 20 μm but preferably is from 0.5 to 2.0 μm.

The surface of finely divided filler particles is hydrophobic in order to make the foam control composition sufficiently effective in aqueous systems. Where they are not naturally hydrophobic, the filler particles must be rendered hydrophobic, which may be done either prior to or after dispersing the filler particles in step (A) of the process of the invention. This can be effected by treatment of the filler particles with treating agents, e.g. fatty acids, reactive silanes or siloxanes, for example stearic acid, dimethyldichlorosilane, trimethylchlorosilane, hexamethyldisilazane, hydroxy-endblocked and methyl-endblocked polydimethylsiloxanes and siloxane resins. Fillers which have already been treated with such compounds are commercially available from many companies, for example Sipernat® D10 from Degussa. The surface of the filler may alternatively be rendered hydrophobic in situ, i.e. after the filler has been dispersed in the liquid siloxane component. This may be effected by adding to the liquid siloxane component prior to, during or after the dispersion of the filler e.g. during step (A) of the process of invention, the appropriate amount of a treating agent, for example of the kind described above, and causing some reaction to take place, for example by heating the mixture to a temperature above 40° C. The quantity of treating agent to be employed will depend for example on the nature of the agent and the filler and will be evident or ascertainable by those skilled in the art. Sufficient should be employed to endow the filler with at least a discernible degree of hydrophobicity. Preferably, the surface of the filler is rendered hydrophobic before dispersion in the reagent mixture.

It is important for the invention that the finely divided filler (i) is added prior to the hydrosilylation reaction of step (B). Later addition does not provide all the benefits in quality of the foam control compositions. The filler (i) is added to the foam control agents in an amount of about 1 to 15, preferably 2 to 5% by weight.

When manufacturing products, such as foam control compositions according to the invention, by chemical reaction from fluid or liquid reactants, one usually wants to obtain a product or material of low to middle viscosity. If the viscosity of the reacting mixture becomes too high (for example above 60 000 centistokes), the material is more difficult to handle and/or to emulsify. If the material gels, it may stick to the manufacturing equipment, resulting in a waste of reactants, loss of production time and production output as well as a need for extra time and effort for the cleaning of equipment. This is supported, for example, by EP 0 516 109 B where on pages 3 and 4 it teaches to limit the cross-linking density and to use low viscosity reactants otherwise "gelation becomes a substantial risk". The applicant surprisingly found that the reaction mixture can be allowed to gel at last partially and may be recovered (for example liquefied or redispersed) by applying shear forces. Furthermore, the compositions then obtained tend to present better antifoam properties than compositions which have not been allowed to gel, independently of their final viscosity.

The reactive substituents of components (ii) and (iii) are silicon bonded hydrogen atoms and silicon-bonded aliphatically unsaturated hydrocarbon groups where the unsaturation is between terminal carbon atoms of said group. It is not important whether the silicon-bonded hydrogen groups or the unsaturated groups are on component (ii) or on component (iii), provided one is predominantly, preferably solely, found on component (ii) and the other is predominantly, preferably solely, found on component (iii).

Although component (ii) may comprise some branching or some pending siloxane units on a predominantly linear backbone, it is most preferred that component (ii) is a linear polyorganosiloxane material. It is particularly preferred that the reactive substituents are located on the terminal silicon atoms of the polyorganosiloxane. Although it is to be noted that having such groups on different silicon atoms in the polymer chain, which chain could be cyclic or linear, would be expected to work also, it is known that such materials are more difficult to obtain and are usually more expensive to produce.

With regard to component (iii) it is not crucial whether this is a linear, branched, resinous or cyclic polyorganosiloxane material. It is preferred that the reactive groups are spaced in the polymer in such a way that they are substituted on different silicon atoms, preferably sufficiently far apart to enable easy reaction with a number of polyorganosiloxane materials of component (ii).

It is preferred that the silicon-bonded aliphatically unsaturated hydrocarbon groups are alkenyl groups, preferably vinyl or allyl groups, most preferably vinyl groups. The description which follows will use the option of component (ii) having the aliphatically unsaturated hydrocarbon groups as substituents and component (iii) having the silicon bonded hydrogen atoms, but it is to be understood that the reverse situation is equally plausible and effective, and the description should be read as including the alternative option with the details applicable accordingly.

The particularly preferred component (ii) which are useful in step (A) of the process of the invention is a vinyl end-blocked polydiorganosiloxane having the general formula Vi-[Si(R$_2$)O]$_n$—Si(R$_2$)Vi, wherein R denotes a monovalent organic group and Vi denotes a vinyl group. The organic group R is preferably a hydrocarbon group of up to 8 carbon atoms, more preferably an alkyl group or an aryl group, e.g. methyl, ethyl, propyl, hexyl or phenyl. It is particularly preferred that at least 80% of all R groups are methyl groups, most preferably 100%. The value of n, which denotes an integer, is such that the viscosity of the vinyl end-blocked polydiorganosiloxane is in the range of from 200 to 100,000 mPa·s, more preferably 2000 to 55,000 mPa·s at a temperature of 25° C.

In step (A) of a process according to the invention the component (iii), being a polyorganosiloxane having silicon-bonded hydrogen atoms, also sometimes referred to as an polyorganohydrogensiloxane, may be cyclic, linear, branched or resinous, or may be a mixture including two or more of such polyorganohydrogensiloxanes. The viscosity of component (iii) is such that it is substantially lower than that of component (ii), preferably no more than 1000 mPa·s at 25° C. Suitable cyclic polyorganohydrogensiloxanes include those of the formula (RR'SiO)$_x$ in which R is as defined above and R' is a group R or a hydrogen atom, provided there are at least three silicon atoms which have a hydrogen atom substituted thereon, and x is an integer with a value of from 3 to 10. Preferably R is an alkyl or aryl radical having from 1 to 6 carbon atoms preferably methyl, each R' is hydrogen and x is an integer from 3 to 5. Suitable linear polyorganohydrogensiloxanes for use as component (iii) include those of the general formula R'$_3$SiO(RR'SiO)$_y$SiR'$_3$ where R and R' are the same as defined above and y is from 2 to 300, preferably 2 to 40, more preferably 3 to 25, provided there are at least 3 silicon-bonded hydrogen atoms per molecule. Resinous or branched polyorganohydrogensiloxane materials for use as component (iii) have a three-dimensional structure and may include monovalent (R'$_3$SiO$_{1/2}$) units, divalent (R'$_2$SiO$_{2/2}$) units, trivalent (R'SiO$_{3/2}$) units and/or tetravalent (SiO$_{4/2}$) units, wherein R' has the same meaning as identified above, provided there are at least 3 silicon-bonded hydrogen groups per molecule. The preferred resinous polyorganohydrogensiloxane materials for use as component (iii) have a molecular weight of no more than 15,000. It is particularly preferred that component (iii) has from 3 to 10, most preferred 3 to 5 silicon-bonded hydrogen atoms per molecule, with each hydrogen atom being substituted on a different silicon atom.

As indicated above, components (ii) and (iii) may be having Si—H and the preferred Si-alkenyl functionality respectively, instead of the ones specifically described above. In such case, component (ii) may be a polyorganohydrogensiloxane, preferably a polydialkylsiloxane having terminal Si—H groups, for example a polydimethylsiloxane having terminal dimethylhydrogensiloxane units and a viscosity at 25° C. of from 200 to 100,000 preferably from 2000 to 55,000 mPa·s. Additionally, component (iii) could be for example a resinous material having mono-functional units (R''$_3$SiO$_{1/2}$), difunctional units (R''$_2$SiO$_{2/2}$), trifunctional units (R''$_2$SiO$_{3/2}$) and tetrafunctional units (SiO$_{4/2}$) wherein R'' denotes a group R or a monovalent unsaturated aliphatic hydrocarbon group. Some OH groups may also be substituted onto some silicon atoms. A particularly preferred resinous material would be a vinyl substituted siloxane resin having mainly monofunctional and tetrafunctional units, a molecular weight of about 5,000 and an average of 3 to 5 vinyl units substituted on different silicon atoms.

It is important that the ratio of components (ii) and (iii) are carefully selected so that the hydrosilylation reaction is well conducted and controlled. By choosing the right level of reactive groups of each type, the cross-linking or branching density can be controlled and pre-determined. In addition, using excess of one functional group, preferably the aliphatically unsaturated hydrocarbon group, the amount of unreacted groups in the final branched or cross-linked polyorganosiloxane can be controlled. This is particularly important where the presence of unreacted SiH groups is to be minimised for example for safety reasons. Preferably the ratio of the number of SiH groups to aliphatically unsaturated Si-bonded hydrocarbon groups is in the range of from 1/10 to 10/1, more preferably the ratio will be from 1/3 to 3/1, most preferably 1/2 to 1/1.

During step (B), components (ii) and (iii) are caused to react by hydrosilylation reaction in the presence of a transition metal catalyst. The transition metal catalyst for use in step (B) of the process of the invention catalyses the hydrosilylation reaction and may be selected from a variety of hydrosilylation catalysts known to promote the reaction of vinyl-functional radicals with silicon-bonded hydrogen atoms. Suitable transition metal catalysts include platinum and rhodium-containing compounds and complexes. Platinum catalysts such as platinum acetylacetonate or chloroplatinic acid are representative of these compounds and suitable for use. A preferred transition metal catalyst is a chloroplatinic acid complex of divinyltetramethyldisiloxane diluted in dimethylvinylsiloxy endblocked polydimethylsiloxane which may be prepared according to methods described by Willing in U.S. Pat. No. 3,419,593. Most preferably this mixture contains about 0.6 weight percent platinum.

It is possible to include the transition metal catalyst at the same time as components (i) to (iii), but if this is done, it is preferred that a method is used of halting the activity of the catalyst till the process is ready to proceed. Such options include the use of an inhibitor, which is discussed below and the use of physical separation, such as encapsulation, which is undone immediately prior to starting step (B) of the process according to the invention. Alternatively, and more preferably, the transition metal catalyst is added in immediately prior to starting step (B) of the process of the invention, which may be done by any known means, and will require some efficient dispersion of the catalyst into the mixture. It is particularly preferred to prepare the mixture of step (A) and bring it to the right temperature to enable the hydrosilylation reaction to occur, at which stage the catalyst, either neat or in diluted form (for example in a small portion of component (ii) or (iii), preferably the component having the aliphatically unsaturated hydrocarbon substituents or in a small portion of a diluent or solvent as discussed below) is introduced and mixed to cause good dispersion in the mixture. Reaction would then proceed immediately.

Hydrosilylation catalysts which are useful as transition metal catalysts for use in step (B) of the process according to the invention are well known in the art and the interested reader is referred to the following patents for detailed descriptions regarding their preparation and use: Speier, U.S. Pat. No. 2,823,218; Willing, U.S. Pat. No. 3,419,359; Kookootsedes, U.S. Pat. No. 3,445,420; Polmanteer et al, U.S. Pat. No. 3,697,473; Nitzsche, U.S. Pat. No. 3,814,731; Chandra, U.S. Pat. No. 3,890,359 and Sandford, U.S. Pat. No. 4,123,604.

Many of the catalysts known in the art require the reactants to be heated in order for a reaction to occur. When such catalysts are employed this requirement must be taken into consideration.

In its simplest terms, the hydrosilylation reaction for forming the branched or cross-linked polyorganosiloxane using the preferred components (ii) and (iii), which is a three dimensional polymer network, in step (B) of the process of the present invention can be characterised as:

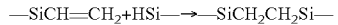

The reaction may be carried out in any convenient way but we prefer to blend the vinyl endblocked polydiorganosiloxane, polyorganohydrogensiloxane, optionally a solvent or diluent and bring that blended mixture up to the required reaction temperature, at which time the transition metal catalyst is added to enable the reaction. The hydrosilylation reaction may occur at ambient temperature, but is preferably carried out at a temperature of from 30 to 100° C., more preferably about 70° C.

Preferably, where component (ii) is the aliphatically unsaturated hydrocarbon group containing polyorganosiloxane, e.g. the vinyl end-blocked polydiorganosiloxane, it is included in the reactant solution in an amount of up to 98%, preferably 80 to 92% by weight based on the weight of components (i), (ii) and (iii) combined in step (A). On the same basis, the amount of finely divided filler (i) would be added in the range of 2 to 15% by weight and the amount of component (iii) would be in the range of 0.1 to 5% by weight based on the total weight of components (i), (ii) and (iii). The optimal amount will be determined to some extent on the choice of the other ingredients, the amount of cross-linking which is desired and the final viscosity of the foam control composition which is aimed at, and some routine experimentation may be necessary to reach the optimum combination. It is therefore particularly useful to select the amount of such components carefully. The presence of optional ingredients may of course affect the absolute amounts and the relative amounts of each of these ingredients used.

The concentrations of transition metal catalyst and optional inhibitor to be used in the present invention may be determined by routine experimentation. Typically, the effective amount of catalyst should be in a range so as to provide from 0.1 to 1000 parts per million (ppm) of the actual metal (e.g. platinum) by weight based on the weight of components (ii) and (iii) combined in the mixture used in step (B) of the process according to the present invention. As an example, when the preferred catalyst mixture (i.e. the chloroplatinic acid complex of divinyltetramethyldisiloxane containing about 0.6% by weight of platinum) and inhibitor (i.e. bis(2-methoxy-1-methylethyl)maleate) are employed, a ratio by weight of inhibitor to catalyst mixture ranging from zero to about 0.6 provides a suitably wide range of inhibition which is adequate under most practical conditions of manufacture.

The branched or cross-linked polyorganosiloxane prepared in step (B) of the process according to the present invention has a three dimensional network and preferably is such that the final foam control composition has a viscosity of from 20,000 to 100,000 mPa·s measured at 25° C., more preferably from 40,000 to 75,000 mPa·s. For purposes of foam control compositions according to the present invention, the branched or cross-linked polyorganosiloxane itself could have a viscosity of from 20,000 to several million mPa·s at 25° C. It is preferred that the cross-linking density of the resulting polyorganosiloxane is as high as possible as that provides better performance in the foam control applications. In order to handle these materials, the amount of solvent or diluent is to be selected such that the final viscosity of the foam control composition is as desired.

In step (A) of the process according to the invention it is optional to include chain extenders. There are materials similar to component (ii), and especially the preferred type of component (ii), being a substantially linear polyorganosiloxane material where the active group is present at the terminal silicon atoms of the siloxane. These materials will perform the role of taking part in the hydrosilylation reaction, but with the effect of spacing out the places where the final polyorganosiloxane is branched. It is therefore suggested that the reactive group of the chain extender is the same as the reactive group of component (iii). Examples of suitable chain extenders would be α,ω-divinyl polydimethylsiloxane, if component (iii) is using the aliphatically unsaturated hydrocarbon reactive groups.

In step (A) of the process according to the invention it is optional, but preferred that a solvent or diluent is employed which is preferably a polydiorganosiloxane. Suitable polydiorganosiloxane solvents or diluents are substantially linear or cyclic polymers, although mixtures thereof can also be used, wherein the silicon-bonded substituents are groups R, as defined above. Most preferably at least 80% of all silicon-bonded substituents are alkyl groups, preferably methyl groups. Most preferred solvents or diluents include trimethylsiloxy end-blocked polydimethylsiloxanes having a viscosity of from 500 to 12,500 mPa·s, more preferably 500 to 5000 mPa·s measured at 25° C. The solvents or diluents are mainly present to solubilise the branched or cross-linked polyorganosiloxane made in step (B) of the process of the invention, which is particularly useful for the higher viscosity branched or cross-linked polydiorganosiloxanes.

The amount of solvent or diluent which can be used may vary widely, and it is preferred that larger amounts of solvent or diluent are used where the branched or cross-linked polyorganosiloxane has itself a higher viscosity. The amounts of solvent or diluent used could be as high as 90% by weight based on the total formulation of the foam control composition, but preferably from 50 to 80% is used. It is most appropriate to determine the amount and type, including viscosity, of solvent or diluent used by trial and error based on the desired viscosity of the final foam control composition. The latter may vary widely, and is often determined by the application in which it is to be used, but it is preferably in the range from 20,000 to 100,000 mPa·s at 25° C., more preferably from 40,000 to 75,000 mPa·s.

When transition metal catalysts such as platinum catalysts are used in step (B) of the process of the invention an inhibitor may be desirable in order to improve the shelf life of the starting materials or to control the viscosity-time profile of the final foam control compositions. These inhibitors are also known in the art and include ethylenically unsaturated isocyanurates, such as trialkyl isocyanurate, dialkylacetylenedicarboxylates, alkyl maleates, di-allylmaleate, phosphine, phosphites, aminoalkyl silanes, sulphoxides, acrylonitrile derivatives and acetylenic alcohols such as 2-methyl-3-butyn-2-ol and others. Particular inhibitors preferably used are diethyl fumarate, bis(2-methoxy-1-methylene)maleate, bis (2-methoxy-1-methylethyl)maleate and 1-ethynyl-1-cyclohexanol. All of these materials are well known in the art and are commercially available products. The amount of inhibitor which could be used in the foam control composition may vary from 0.001 to 2% by weight based on the total weight of the foam control composition, but more preferably would be in the range of 0.005 to 0.5% by weight. Selection of appropriate inhibitors will also depend on the end use of the foam control agent, as some of the named inhibitors are not acceptable for food contact purposes.

Upon completion of step (B) of the process according to the invention, it may be possible to use the foam control agent in any suitable form, including as a neat component as obtained from step (B), in diluted form, in the form of a dispersion, in the form of an emulsion or in the form of a granule. The neat foam control composition is often a relatively viscous liquid. At least partial gelation of the reaction mixture will have occurred during step (B). A gelled material is jelly-like, with a physical state intermediate between solid and liquid state, usually flowable under pressure, but not freely flowing under atmospheric pressure. Where the material is not sufficiently flowable, such as obtained after the at least partial gelation, shearing forces are to be applied, for example through thorough stirring or by passing the material through a homogenizer or other mixer to improve its flowability. The improvement in flowability can be achieved by dispersing, redispersing or liquefying the material through application of the shearing forces. This may be done prior to use of the neat material or prior to further manipulation to provide it in another suitable form, such as a emulsion. A certain amount of flowability of the foam control compositions according to the invention is important for the foam control compositions to work effectively in a liquid or liquid containing environment.

For most applications, it is preferred that the foam control composition is emulsified, as this helps with dosing and dispersion of the foam control composition in its final application. Emulsions may be obtained by standard (mechanical) emulsification processes in a subsequent step in the process according to the invention. Alternatively emulsification may be obtained by forming an emulsion during step (A), followed by the cross-linking reaction of step (B) being carried out in the emulsion particles. Such process is often referred to as emulsion polymerisation process. Suitable surfactants for the emulsification of foam control agents are well known and have been described in a number of publications. In typical emulsions, the continuous phase is preferably water, but some alternative or additional materials may be used, which are compatible with water, such as alcohols or polyoalkylenes. Preferably the continuous phase is predominantly water and is present in amounts from 30 to 95% by weight of the total weight of the emulsified foam control composition. The components (i), (ii), and (iii) would normally provide from 5 to 50% by weight of such an emulsion and the surfactants would represent from 1 to 20% by weight.

Suitable surfactants may comprise a nonionic surfactant, a cationic surfactant, an anionic surfactant, an amphoteric surfactant, or a mixture of such surfactants. Preferably the nonionic surfactants are used. They could be a silicon-atom-containing nonionic emulsifier, but for the emulsification mostly non-silicon containing nonionic emulsifier are used. Suitable nonionic surfactants include sorbitan fatty esters, ethoxylated sorbitan fatty esters, glyceryl esters, fatty acid ethoxylates, alcohol ethoxylates $R^3$—$(OCH_2CH_2)_a OH$, particularly fatty alcohol ethoxylates and organosiloxane polyoxyethylene copolymers. Fatty alcohol ethoxylates typically contain the characteristic group —$(OCH_2CH_2)_a OH$ which is attached to a monovalent fatty hydrocarbon residue $R^3$ which contains about eight to about twenty carbon atoms, such as lauryl (C12), cetyl (C16) and stearyl (C18). While the value of "a" may range from 1 to about 100, its value is typically in the range of about 2 to about 40, preferably 2 to 24. It is sometimes helpful to use a combination of surfactants to aid the emulsification.

Some examples of suitable nonionic surfactants are polyoxyethylene (4) lauryl ether, polyoxyethylene (5) lauryl ether, polyoxyethylene (23) lauryl ether, polyoxyethylene (2) cetyl ether, polyoxyethylene (10) cetyl ether, polyoxyethylene (20) cetyl ether, polyoxyethylene (2) stearyl ether, polyoxyethylene (10) stearyl ether, polyoxyethylene (20) stearyl ether, polyoxyethylene (21) stearyl ether, polyoxyethylene (100) stearyl ether, polyoxyethylene (2) oleyl ether, and polyoxyethylene (10) oleyl ether. These and other fatty alcohol ethoxylates are commercially available under trademarks and tradenames such as ALFONICO, BRIJ, GENAPOL (S), NEODOL, SURFONIC, TERGITOL and TRYCOL. Ethoxylated alkylphenols can also be used, such as ethoxylated octylphenol, sold under the trademark TRITONS.

Cationic surfactants useful in the invention include compounds containing quaternary ammonium hydrophilic moieties in the molecule which are positively charged, such as quaternary ammonium salts represented by $R^4_4N^+X^-$ where each $R^4$ are independently alkyl groups containing 1-30 carbon atoms, or alkyl groups derived from tallow, coconut oil, or soy; and X is halogen, i.e. chlorine or bromine. Most preferred are dialkyldimethyl ammonium salts represented by $R^5_2N^+(CH_3)_2X^-$, where each $R^5$ is an alkyl group containing 12-30 carbon atoms, or alkyl groups derived from tallow, coconut oil, or soy and X is as defined above. Monoalkyltrimethyl ammonium salts can also be employed, and are represented by $R^5N^+(CH_3)_3X^-$ where $R^5$ and X are as defined above.

Some representative quaternary ammonium salts are dodecyltrimethyl ammonium bromide (DTAB), didodecyldimethyl ammonium bromide, dihexadecyldimethyl ammonium chloride, dihexadecyldimethyl ammonium bromide, dioctadecyldimethyl ammonium chloride, dieicosyldimethyl ammonium chloride, didocosyldimethyl ammonium chloride, dicoconutdimethyl ammonium chloride, ditallowdimethyl ammonium chloride, and ditallowdimethyl ammonium bromide. These and other quaternary ammonium salts are commercially available under tradenames such as ADOGEN, ARQUAD, TOMAH and VARIQUAT.

Among the various types of anionic surfactants which can be used are sulfonic acids and their salt derivatives; alkali metal sulfosuccinates; sulfonate glyceryl esters of fatty acids such as sulfonate monoglycerides of coconut oil acids; salts of sulfonate monovalent alcohol esters such as sodium oleyl isothionate; amides of amino sulfonic acids such as the sodium salt of oleyl methyl tauride; sulfonate products of fatty acid nitriles such as palmitonitrile sulfonate; sulfonate aromatic hydrocarbons such as sodium alphanaphthalene monosulfonate; condensation products of naphthalene sulfonic acids with formaldehyde sodium octahydro anthracene sulfonate; alkali metal alkyl sulfates such as sodium lauryl (dodecyl) sulfate (SDS); ether sulfates having alkyl groups of eight or more carbon atoms; and alkylaryl sulfonates having one or more alkyl groups of eight or more carbon atoms.

Some examples of commercial anionic surfactants useful in this invention include triethanolamine linear alkyl sulfonate sold under the tradename BIO-SOFT N-300 by the Stepan Company, Northfield, Ill.; sulfates sold under the tradename POLYSTEP by the Stepan Company; and sodium n-hexadecyl diphenyloxide disulfonate sold under the tradename DOWFAX 8390 by The Dow Chemical Company, Midland, Mich.

Amphoteric surfactants can also be used which generally comprise surfactant compositions such as alkyl betaines, alkylamido betaines, and amine oxides, specific examples of which are known in the art.

Optional ingredients may also be included in the emulsions of foam control compositions according to the invention. These are well known in the art and include for example thickeners, preservatives, pH stabilisers etc. Suitable examples of thickeners include sodium alginate, gum arabic, polyoxyethylene, guar gum, hydroxypropyl guar gum, ethoxylated alcohols, such as laureth-4 or polyethylene glycol 400, cellulose derivatives exemplified by methylcellulose, methylhydroxypropylcellulose, hydroxypropylcellulose, polypropylhydroxyethylcellulose, starch, and starch derivatives exemplified by hydroxyethylamylose and starch amylose, locust bean gum, electrolytes exemplified by sodium chloride and ammonium chloride, and saccharides such as fructose and glucose, and derivatives of saccharides such as PEG-120 methyl glucose diolate or mixtures of 2 or more of these and acrylic polymer thickeners (e.g. those sold under the tradenames PEMULEN and CARBOPOL). Suitable preservatives include the parabens, BHT, BHA and other well known ingredients such as isothiazoline or mixtures of organic acids like benzoic acid and sorbic acid.

Where emulsification is intended, it is preferred to introduce another optional ingredient. This may be included with the ingredients in step (A) of the process according to the invention or may be added immediately prior to the emulsification process. This optional ingredient is a silicone resin having monofunctional (M) and tetrafunctional (Q) units and optionally difunctional (D) and/or trifunctional (T) units. The silicone resin may be for example an organosilicon compound with the average units of the general formula $R^6_d SiX_{4-d}$ in which $R^6$ is a monovalent hydrocarbon group having 1 to 5 carbon atoms, X is a hydrolyzable group and d has an average value of one or less. Alternatively it may be a partially hydrolyzed condensate of the organosilicon compound described immediately above. Examples are alkyl polysilicate wherein the alkyl group has one to five carbon atoms, such as methyl polysilicate, ethyl polysilicate and propyl polysilicate.

Preferably it is a resin which only has M and Q units and is also known as MQ resin. The preferred MQ resins are those consisting essentially of $(CH_3)_3SiO_{1/2}$ units and $SiO_{4/2}$ units wherein the ratio of $(CH_3)_3SiO_{1/2}$ units to $SiO_{4/2}$ units is from 0.4:1 to 1.2:1 or a condensate of said MQ resin with the organosilicon compound described above. These silicone resins have been known and described in a number of publications and are commercially available. The preferred examples of a suitable MQ resin is a siloxane resin copolymer consisting essentially of $(CH_3)_3SiO_{1/2}$ units and $SiO_2$ units in a molar ratio of approximately 0.75:1.

The main benefit for the use of the silicone resin is that it has surprisingly been found that the use of small amounts of such resin substantially facilitates the emulsification of the foam control compositions according to this invention. Indeed addition of as little as up to 0.5% of a silicone resin by weight, based on the weight of the foam control composition will enable foam control agents with high viscosity or high molecular weight branched or cross-linked polyorganosiloxanes to be readily emulsified by mechanical means, which would otherwise be extremely difficult. Also it was found that the addition of such small amounts of silicone resin provides emulsions with smaller particle size for identical emulsification processes. This of course will lead to greater stability of the emulsion. Larger amounts than 0.5% may also be added, but do not provide any further benefit to the emulsification step of the process according to the invention.

Alternative ways of providing the foam control compositions according to the invention include dispersions thereof. For example U.S. Pat. No. 6,656,975 describes a silicone composition comprising a continuous phase of a polar organic liquid having dispersed therein particles of a silicone active material (such as a silicone antifoam) encapsulated within an organic encapsulating material which is solid at 25° C., is sparingly soluble in the polar organic liquid at 25° C. but is substantially dissolved in the polar organic liquid at an elevated temperature in the range 40-100° C., wherein the three phase contact angle between the organic encapsulating material, the silicone antifoam, and the polar organic liquid, with the angle measured through the silicone, is below 130°. The disclosure includes a foam control composition comprising a continuous phase of a polar organic liquid having dispersed therein a polyorganosiloxane fluid combined with a surfactant of HLB below 8 and a hydrophobic silicaceous material. Particular examples of suitable polar organic liquids include propylene glycol, polyethylene glycols, polypropylene glycols and copolymers of polyethers, such as materials sold under the tradenames of Pluriol® and Pluronic®. Polyorganosiloxane oxypolyalkylene copolymers may also be added to help render the dispersions self-emulsifiable in aqueous media.

Yet another suitable approach to deliver the foam control compositions according to the present invention is by providing them in particulate or granular form. Particulate foam control compositions often contain a carrier material for the foam control agent to make the foam control composition into a more substantial solid particulate material and facilitate its handling. The particulate foam control compositions are used for example by post-blending them as a powder with the rest of a powder detergent composition. Materials that have been suggested as carrier materials for particulate silicone based foam control compositions include water soluble, water insoluble and water dispersible materials. Examples of suggested carrier materials are sulphates, carbonates, such as for example soda ash, phosphates, polyphosphates, silicas, silicates, clays, starches, cellulosic materials and aluminosilicates. Often, the encapsulating or protective materials are used in combination with the carrier material.

A foam control composition comprising an encapsulating or protective material is known from EP636684, which comprises from 1 to 30 parts by weight of a silicone antifoam, from 70 to 99 parts by weight of a zeolite carrier for the antifoam, from 1 to 60% by weight of the silicone antifoam of a surface active agent which has been deposited on the zeolite carrier not later than the silicone antifoam and from 1 to 40 parts by weight of a polycarboxylate-type binder or encapsulant. In U.S. Pat. No. 6,165,968, there is disclosed that such polycarboxylate-type binder preferably has a pH of 3 or less when dissolved in water. Processes for making foam control compositions in granular form are known from these and other documents, include spray drying, agglomerated granulation processes and the like and can be applied to the foam control compositions of this invention to provide the particulate or granular material for use in many applications, such a powder detergent formulations.

It has been found that the foam control compositions of the present invention offer particular advantage when the foaming system comprises highly acid or highly basic aqueous environments, such as those having a pH of less than about 3 or greater than about 12. This holds particularly for highly acidic or basic systems at elevated temperatures. Thus, for example, under the extremely harsh conditions encountered in paper pulp manufacture, wherein the aqueous foaming medium (Kraft® process "black liquor") has a pH of 12 to 14 and a temperature of 50° C. to 100° C., the foam control compositions of the present invention have been found to provide defoaming activity for considerably greater time periods than antifoam agents of the prior art. They also tend to provide a good antifoaming effect in that they knock down existing foam effectively.

The foam control compositions of the present invention can be used as any kind of foam control compositions, i.e. as defoaming agents and/or antifoaming agents. Defoaming agents are generally considered as foam reducers whereas antifoaming agents are generally considered as foam preventors. The foam control compositions of the present invention find utility in various media such as inks, coatings, paints, detergents, including textile washing, laundry and auto dish washing, black liquor, and pulp and paper manufacture, waste water treatment, textile dyeing processes, the scrubbing of natural gas.

In the following examples foam control agents have been prepared to exemplify the invention. They are to be seen as representative, but not restrictive of the invention. All parts and percentages are by weight, unless otherwise defined and all viscosities are dynamic viscosities, measured at 25° C., unless otherwise indicated.

COMPARATIVE EXAMPLE 1

In a beaker were mixed 20 parts of a mixture of 52% vinyl functional resinous polyorganosiloxane having a molecular weight of about 13,000 in a mixture of trimethyl siloxy and vinyldimethyl siloxy end-groups and 48% vinyldimethyl end-blocked polydimethyl siloxane with an average degree of polymerisation (DP) of 14, 580 parts of a dimethylhydrogen end-blocked polydimethyl siloxane with a viscosity of 13,000 mPa·s with 125 parts of Sipernat D10 from Degussa and as a diluent there was added 2366 parts of trimethyl end-blocked polydimethyl siloxane having a viscosity of 1000 mPa·s and 31 parts of a resinous polyorganosiloxane having a molecular weight of about 13,000 and having trimethyl siloxy end-groups. The ratio of Si-vinyl groups to Si-hydrogen atoms was 0.65. The components were mixed in a Hauschild® Dental mixer for 100 seconds. After the mixture was found to be well dispersed at ambient temperature, at which time 3 parts by weight of a catalyst which was a chloroplatinic acid complex of divinyltetramethyldisiloxane diluted in 70% by weight of dimethylvinylsiloxy endblocked polydimethylsiloxane which may be prepared according to methods described by Willing in U.S. Pat. No. 3,419,593 were added and mixed in. The mixture was allowed to react over a period of 24 hours at room temperature, at which time 10 parts of diallyl maleate were added by admixture and homogenisation. After reaction, a homogeneous, viscous liquid was obtained which was used as such. The final viscosity of the foam control composition was 44,600 mPa·s at 25° C.

EXAMPLE 2

A foam control composition was prepared along the lines of Example 1, except that instead of 580 parts of the dimethylhydrogen end-blocked polydimethyl siloxane with a viscosity of 13,000 mPa·s, only 434 parts were used, instead of the 20 parts of the mixture of 52% vinyl functional resinous polyorganosiloxane having a molecular weight of about 13,000 and a mixture or trimethyl siloxy and vinyldimethyl siloxy end-groups and 48% vinyldimethyl end-blocked polydimethyl siloxane with an average DP of 14, only 0.16 parts were used, and instead of the 2366 parts of the trimethyl end-blocked polydimethyl siloxane having a viscosity of 1000 mPa·s, 2516 parts were used. After reaction, a gelled-up mixture was obtained which stuck to the manufacturing equipment and could not be handled or emulsified as such. It was then mixed with shear and the gel turned into a viscous liquid. The ratio of silicon-bonded vinyl groups to silicon-bonded hydrogen atoms was 0.7 and the final viscosity was 35000 mPa·s.

EXAMPLE 3

The foam control compositions of Comparative Example 1 and Example 2 were then emulsified, using the following process.
105 parts of the foam control compositions of Comparative Example 1 and Example 2 were each placed in a separate receptacle, which was heated to 70° C. A mixture of 9.3 parts of Volpo S2 and 9.3 parts of Brij 78 surfactants was preheated to 60° C. and mixed in with the compositions. 45 parts of a mixture of 0.76 parts of Keltrol RD, 2.32 parts of Natrosol 250LR, 0.16 parts of sorbic acid, 0.32 parts of benzoic acid, 0.77 parts of a 10% solution of sulphuric acid and 95.66 parts of water were added and after thorough mixing, another 112 parts of the mixture were added and mixed in. Then 219.5 parts of water were added also, resulting in an emulsion of the foam control compositions of Comparative Example 1 and Example 2.

EXAMPLE 4

The emulsified foam control compositions of Example 3 were tested in a foam cell using on softwood liquor. To this effect 600 ml of softwood is preheated at 90° C. and introduced in a graduated and thermostatically controlled glass cylinder having an inner diameter of 5 cm. This foamable liquid was circulated through a circulation pipe at a temperature adjusted to 89° C. The circulation flow rate is controlled using a MDR Johnson pump set up at a frequency of 50 Hz. When the foam height of 30 cm is reached, 150 µl of emulsion of the tested foam control composition is injected in the liquid jet. The evolution of the foam height was monitored and recorded. The foam height was measured in cm over a sufficient period to allow the foam control composition to have exhausted its capacity, which is when the foam height of 29 cm has been reached again in the foam cell, and the time at which this occurred was measured as it indicates the longevity of the foam control composition. The first time overflow is mentioned below, the time (in seconds) when first overflow occurred is given in the table.

The results were as shown in Table 1:

TABLE 1

| Time (seconds) | Foam Height Comp Ex. 1 (cm) | Foam Height Ex. 2 (cm) |
|---|---|---|
| 0 | 30 | 30 |
| 20 | 17 | 17 |
| 40 | 18 | 17.5 |
| 60 | 19.5 | 18 |
| 80 | 22.5 | 20 |
| 100 | 25.5 | 22 |
| 120 | 27 | 24 |
| 140 | 28 | 24 |
| 160 | 27.5 | 26 |
| 180 | 28 | 26.5 |
| 200 | 29 | 27.5 |
| 220 | Overflow-210 | 27.5 |
| 240 | Overflow | 27 |
| 260 | Overflow | 28 |
| 280 | Overflow | 28.5 |
| 300 | Overflow | Overflow-300 |

As can be seen on table above, the composition of Example 2, showed an improved persistency as compared to composition of Comparative Example 1, showing that a more highly cross-linked polyorganosiloxane material (resulting from a greater Si-vinyl/Si—H ratio) does improve foam controlling ability.

COMPARATIVE EXAMPLE 5

A foam control composition (Comparative Example 5a) was prepared by mixing 1820 parts of a trimethyl siloxane end-blocked polydimethyl siloxane having a viscosity of 1000 mPa·s, 834 parts of a dimethylvinylsiloxane end-blocked polydimethyl siloxane having a viscosity of 9000 mPa·s, 140 parts of a 31% mixture of resinous polyorganosiloxane having a molecular weight of about 13,000 and trimethyl siloxy end-groups and 69% of a trimethyl end-blocked polydimethyl siloxane having a viscosity of 1000 mPa·s, 7.5 parts of a trimethylsiloxane end-blocked copolymer of dimethylsiloxane units and methylhydrogensiloxane units, having a viscosity of about 7 mPa·s and 0.3% of SiH groups and 3.5 parts of the catalyst used in Example 1 was mixed in and the mixture left to react under agitation at a temperature of 40° C. for 2.5 hours. The resulting gelled mixture was homogenised under shear forces before 1.1 parts of diallyl maleate and 12 parts of Sipernat D10 silica were dispersed into the compound. The resulting Comparative Example 5 had a viscosity of 80,600 mPa·s.

A similar foam control composition (Comparative Example 5b) was carried out using a different silica filler (Sipernat D17, which has a larger average particle size, a larger specific surface area, and is made hydrophobic via a different treatment). The viscosity of the final material was 50,800 mPa·s.

EXAMPLE 6

A foam control composition (6a) was prepared by mixing 193.9 parts of a trimethyl siloxane end-blocked polydimethyl siloxane having a viscosity of 1000 mPa·s, 88.8 parts of a dimethylvinylsiloxane end-blocked polydimethyl siloxane having a viscosity of 9000 mPa·s, 15.2 parts of a 31% mixture of resinous polyorganosiloxane having a molecular weight of about 13,000 and trimethyl siloxy end-groups and 69% of a trimethyl end-blocked polydimethyl siloxane having a viscosity of 1000 mPa·s, 0.8 parts of a trimethylsiloxane end-blocked copolymer of dimethylsiloxane units and methylhydrogensiloxane units, having a viscosity of about 7 mPa·s and 0.3% of SiH groups and 0.34 parts of the catalyst used in Example 1 and 1.24 parts of Sipernat D10 was mixed in and the mixture left to react under agitation at a temperature of 40° C. for 2.5 hours. The resulting gelled mixture was homogenised under shear forces before 0.11 parts of diallyl maleate were dispersed into the compound. The resulting Example 6a had a viscosity of 59,600 mPa·s.

A similar foam control composition (Example 6b) was carried out using a different silica filler (Sipernat D17, which has a larger average particle size, a larger specific surface area, and is made hydrophobic via a different treatment). The viscosity of the final material was 49,200 mPa·s.

EXAMPLE 7

The foam control compositions of Examples 5 and 6 were tested in the foam cell in softwood black liquor, as detailed in Example 4 above. The results are provided in Table 2 below. Again the first time overflow occurred is given in seconds after the firs mention of overflow in the table below.

TABLE 2

| | foam height in function of time | | | |
|---|---|---|---|---|
| Time (sec) | Comp Ex 5a | Comp Ex 5b | Example 6a | Example 6b |
| 0 | 30 | 30 | 30 | 30 |
| 20 | 15.5 | 17 | 16 | 17 |
| 40 | 16 | 16.5 | 17.5 | 18 |
| 60 | 17.5 | 19.5 | 17.5 | 18 |
| 80 | 19.5 | 21.5 | 19.5 | 19.5 |
| 100 | 22.5 | 20 | 21 | 20.5 |
| 120 | 24 | 22 | 22.5 | 21 |
| 150 | 26.5 | 22.5 | 23 | 21.5 |
| 180 | 27 | 24 | 25 | 21.5 |
| 200 | 27.5 | 24.5 | 25 | 22 |
| 250 | Overflow-250 | 26.5 | 25 | 24.5 |
| 300 | Overflow | 28.5 | 26 | 25 |
| 400 | Overflow | Overflow-320 | 27 | 27 |
| 500 | Overflow | Overflow | Overflow-500 | 28.5 |

It is observed that the foam control composition which is according to the invention has an excellent persistency while all the other shows only a moderate persistency (time for the foam level to reach the maximum). Adding silica after reaction gives lower persistency compositions.

EXAMPLE 8

Foam control compositions were prepared using the ingredients of Example 6 except that the mixture of 31% resinous polyorganosiloxane and 69% of a trimethyl end-blocked polydimethyl siloxane was omitted and that the trimethylsiloxane end-blocked copolymer of dimethylsiloxane units and methylhydrogensiloxane units, having a viscosity of about 7 mPa·s was replaced in Example 8a by a trimethylsiloxane end-blocked copolymer of dimethylsiloxane units and methylhydrogensiloxane units, having a DP of 100 and having 6% of the silicon atoms bearing a hydrogen substituent, in Example 8b with a resinous material having silicon-bonded hydrogen atoms, in Example 8c with a trimethylsiloxane end-blocked copolymer of dimethylsiloxane units and methylhydrogensiloxane units, having a DP of 33 of which six silicon atoms had a hydrogen substituent and in Example 8d with another SiH containing silicon resin and that the hydrosilylation reaction was carried out at 60° C. for 3 hours and that the Si-vinyl over SiH ratio was 2.1/1 in the cases of Examples 8a, 8c and 8d. In Example 8b, the reaction was carried out at 37° C. for 2.5 hours and the SiVi/SiH ratio was 1.3/1. After application of shear, viscosities of the resulting foam control compositions were respectively 52,400, 41,600, 48,600 and 56,000 mPa·s. In all cases did the foam control composition provide excellent ability to control the foam in the black liquor experiment described in Example 4.

EXAMPLE 9

Foam control compositions were prepared according to Example 6, using 12.5 parts of the Sipernat D10, 150 parts of the dimethylvinylsiloxane end-blocked polydimethyl siloxane having a viscosity of 9000 mPa·s, with 0.8 parts of trimethylsiloxane end-blocked copolymer of dimethylsiloxane units and methylhydrogensiloxane units, having a viscosity of about 7 mPa·s, with 148.9 parts of the combination of the resinous polyorganosiloxane having a molecular weight of about 13,000 and trimethyl siloxy end-groups and trimethyl end-blocked polydimethyl siloxane having a viscosity of 1000 mPa·s, but with the amount of resin varying from 2% for Example 9a, over 1% for Example 9b, 0.5% for Example 9c, 0.1% for Example 9d and 0% for comparative Example 9e based on the total weight of the foam control composition, and using a reaction temperature of 60° C. for 3 hours. All compositions were then emulsified in accordance with the detailed process as shown in Example 3, immediately following the hydrosilylation reaction.

The results are summarised in the Table below.

| Example | Emulsification after reaction |
|---|---|
| 9a | OK/nice emulsion |
| 9b | OK/nice emulsion |
| 9c | OK/nice emulsion |
| 9d | Borderline/inhomogeneous |
| 9e (comp) | Difficult/very inhomogeneous |

It shows that the compound without resin was very difficult to emulsify and gave a very inhomogeneous emulsion. It could also be seen that addition of 0.1% resin improved the emulsification but still gave some inhomogeneity, while the presence of 0.5% resin produced a perfect emulsion. Higher amounts of resin did not give a visible further improvement upon emulsification. In addition it was found that the presence of the resin improved the consistency of particle size of the emulsion particles, and even managed to reduce the particle size and hence improve the stability and homogeneity of the emulsion.

Details are provided in the Table below

| Example | Emulsification after reaction |
|---|---|
| 9a | Ranging from 0.5 to <10μ |
| 9b | Average slightly below 10μ |
| 9c | Average of 10μ |
| 9d | Ranging from about 10 to <50μ |
| 9e (comp) | Ranging from about 10 to >200μ |

These results confirm that resin addition greatly enhances or restores the emulsification of foam control compositions according to the invention. Only very small addition levels are necessary.

The invention claimed is:

1. A process comprising the steps of:
 A) mixing, before step (B),
  (i) a finely divided filler comprising silica with a surface area as measured by BET measurement of at least 50 m²/g,
  (ii) a polyorganosiloxane having at least two reactive substituents capable of addition reaction with component (iii) via hydrosilylation, and
  (iii) a polyorganosiloxane having at least three reactive substituents, capable of addition reaction with component (ii) via hydrosilylation;
 B) followed by causing hydrosilylation reaction of components (ii) and (iii) in the presence of a transition metal catalyst wherein
the hydrosilylation reaction is conducted until the reaction mixture at least partially gels, and shearing forces are applied to this at least partially gelled reaction mixture and wherein the foam control composition is combined with an aqueous environment selected from inks, coatings, paints, detergents, black liquor of from those encountered during pulp and paper manufacture, waste water treatment, textile dyeing processes or the scrubbing of natural gas.

2. A process according to claim 1, wherein the finely divided filler (i) is selected from precipitated silica and gel formation silica with a particle size of from 0.5 to 2 um.

3. A process according to claim 1, wherein component (i) is added in an amount of from 2 to 15% by weight, component (ii) in an amount of from 80 to 92% by weight, and component (iii) in an amount of from 0.1 to 5% by weight based on the total weight of components (i), (ii) and (iii), and the amount of transition metal catalyst is in the range of providing 0.1 to 1000 parts per million of the metal by weight based on the combined weight of components (ii) and (iii).

4. A process according to claim 1, wherein component (ii) and component (iii) have reactive substituents selected from silicon bonded hydrogen atoms and silicon-bonded aliphatically unsaturated hydrocarbon groups, where the unsaturation is between the terminal carbon atoms of the group.

5. A process according to claim 1, wherein component (ii) is a linear polyorganosiloxane material with the reactive groups situated on the terminal silicon atoms thereof.

6. A process according to claim 4, wherein the aliphatically unsaturated hydrocarbon is a vinyl or allyl group.

7. A process according to claim 1, wherein component (iii) is selected from cyclic, linear, branched or resinous polyorganosiloxanes or a mixture including two or more of such polyorganosiloxanes, whereof the viscosity is lower than that of component (ii).

8. A process according to claim 1, wherein component (iii) is a resinous polyorganosiloxane that has a molecular weight of no more than 15,000, has from 3 to 10 silicon-bonded reactive groups per molecule, with each being substituted on a different silicon atom.

9. A process according to claim 1, wherein the ratio of reactive groups in components (ii) and (iii) is such that on average from 3/1 to 1/3 SiH groups are used for every silicon bonded aliphatically unsaturated hydrocarbon group.

10. A process according to claim 1, wherein the foam control composition has a viscosity of from 20,000 to 100,000 mPa·s measured at 25° C.

11. A process according to claim 1, which also comprises in step (A) from 50 to 80% by weight of a polydiorganosiloxane as a solvent or diluent having a viscosity from 500 to 12,500 mPa·s at 25° C., based on the total weight of the foam control composition.

12. A process according to claim 1, wherein the foam control composition has a viscosity in the range from 40,000 to 75,000 mPa·s at 25° C.

13. A process according to claim 1 wherein after step (B), the foam control composition is emulsified as an oil-in-water emulsion.

14. A process according to claim 13, wherein a silicone resin having monofunctional and tetrafunctional units is added in amounts of up to 5% by weight of the total weight of the foam control composition.

15. A process according to claim 1, where the aqueous environment has a pH of less than 3 or more than 12.

16. A process according to claim 1, wherein the shearing forces are applied to the foam control composition comprising the at least partially gelled reaction mixture through a step selected from stifling of the mixture, passing the mixture through a homogenizer, and passing the mixture through a mixer to improve its flowability.

17. A process according to claim 16, wherein the flowability of the at least partially gelled reaction mixture resulting from step (B) is improved by dispersing, redispersing or liquefying the mixture through application of the shearing forces.

18. A process according to claim 1, wherein the application of the shearing forces is applied prior to use of the foam control composition as a neat material or prior to further manipulation of the mixture resulting from step (B) to provide it in an emulsion form.

19. A process according to claim 5, wherein the aliphatically unsaturated hydrocarbon is a vinyl or allyl group.

20. A process comprising the steps of:
A) mixing, before step (B),
  (i) a finely divided filler comprising silica with a surface area as measured by BET measurement of at least 50 $m^2/g$,
  (ii) a polyorganosiloxane having at least two reactive substituents capable of addition reaction with component (iii) via hydrosilylation, and
  (iii) a polyorganosiloxane having at least three reactive substituents, capable of addition reaction with component (ii) via hydrosilylation;
B) followed by causing hydrosilylation reaction of components (ii) and (iii) in the presence of a transition metal catalyst wherein
the hydrosilylation reaction is conducted until the reaction mixture at least partially gels, and shearing forces are applied to this at least partially gelled reaction mixture and wherein foam control composition has a viscosity of from 20,000 to 100,000 mPa·s measured at 25° C., and wherein the foam control composition is combined with an aqueous environment selected from inks, coatings, paints, detergents, black liquor of from those encountered during pulp and paper manufacture, waste water treatment, textile dyeing processes or the scrubbing of natural gas.

21. A process comprising the steps of:
A) mixing, before step (B),
  (i) a finely divided filler comprising silica with a surface area as measured by BET measurement of at least 50 $m^2/g$,
  (ii) a polyorganosiloxane having at least two reactive substituents capable of addition reaction with component (iii) via hydrosilylation, and
  (iii) a polyorganosiloxane having at least three reactive substituents, capable of addition reaction with component (ii) via hydrosilylation;
B) followed by causing hydrosilylation reaction of components (ii) and (iii) in the presence of a transition metal catalyst wherein
the hydrosilylation reaction is conducted until the reaction mixture at least partially gels, and shearing forces are applied to this at least partially gelled reaction mixture;
wherein after step (B), the foam control composition ius emulsified as an oil-in-water emulsion, and wherein the foam control composition is combined with an aqueous environment selected from inks, coatings, paints, detergents, black liquor of from those encountered during pulp and paper manufacture, waste water treatment, textile dyeing processes or the scrubbing of natural gas.

22. A process according to claim 21, wherein a silicone resin having monofunctional and tetrafunctional units is added in amounts of up to 5% by weight of the total weight of the foam control composition.

23. A process for making a foam control composition comprising a cross-linked polyorganosiloxane material in which is dispersed a finely divided filler, whose surface is hydrophobic, which comprises the steps of
A) mixing, before step (B), a finely divided filler comprising silica with a surface area as measured by BET measurement of at least 50 $m^2/g$,
  (i) a finely divided filler comprising silica with a surface area as measured by BET measurement of at least 50 $m^2/g$,
  (ii) a polyorganosiloxane having at least two reactive substituents capable of addition reaction with component (iii) via hydrosilylation, and
  (iii) a resinous polyorganosiloxane having from 3 to 10 silicon-bonded reactive groups per molecule with each silicon-bonded reactive group being substituted on a different silicon atom, having a molecular weight of no more than 15,000, and being capable of addition reaction with component (ii) via hydrosilylation;
B) followed by causing hydrosilylation reaction of components (ii) and (iii) in the presence of a transition metal catalyst wherein the hydrosilylation reaction is conducted until the reaction mixture at least partially gels, and shearing forces are applied to this at least partially gelled reaction mixture.

* * * * *